Nov. 22, 1955     A. BLATTMANN     2,724,282
REVERSIBLE TORQUE AMPLIFIER WITH TAKE-OFF SHAFT
Filed Feb. 9, 1954     2 Sheets-Sheet 2
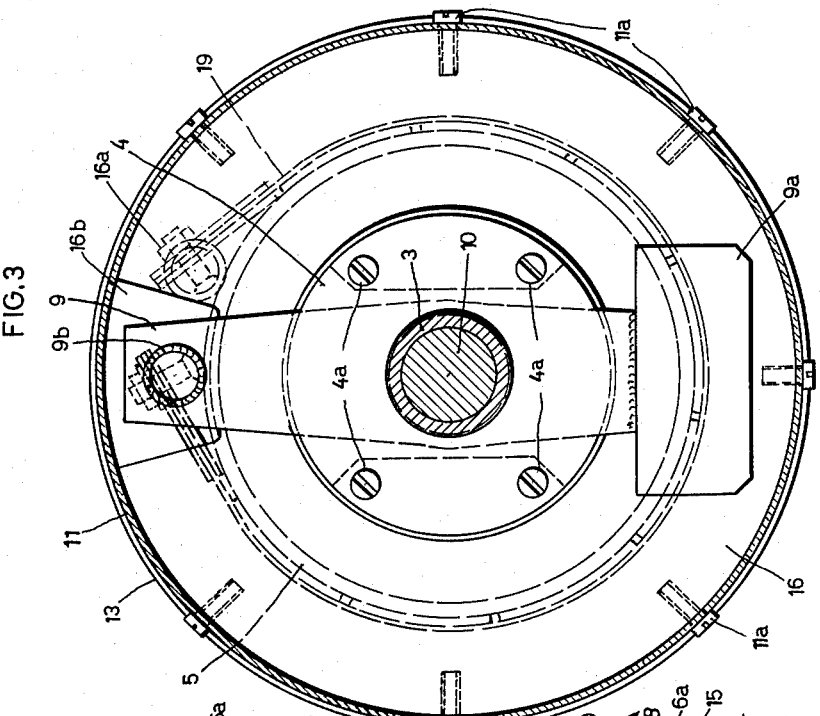
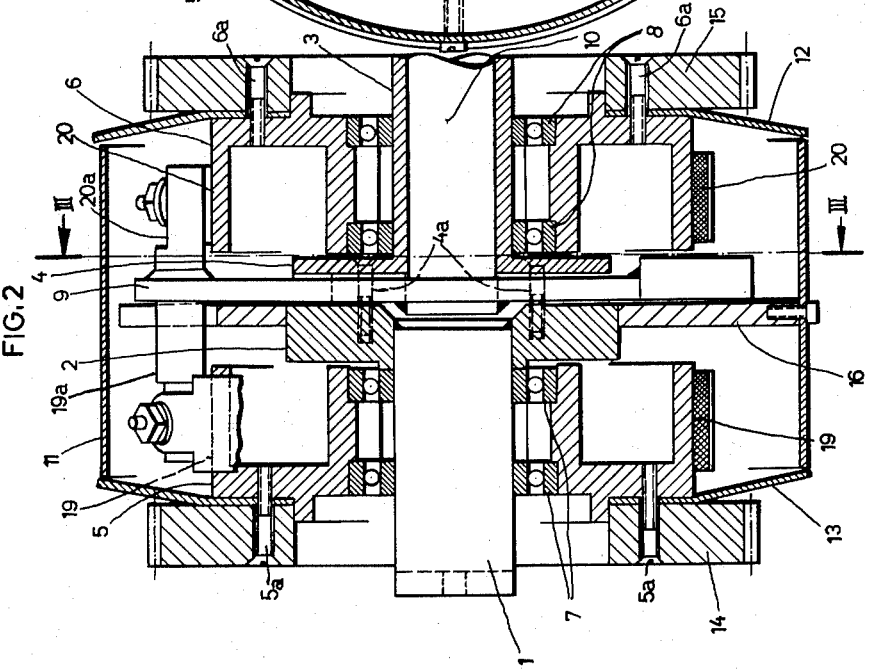

United States Patent Office 2,724,282
Patented Nov. 22, 1955

2,724,282

REVERSIBLE TORQUE AMPLIFIER WITH TAKE-OFF SHAFT

Albert Blattmann, Nurnberg, Germany, assignor to Siemens-Schuckertwerke Aktiengesellschaft, Erlangen, Germany, a corporation of Germany Application February 9, 1954, Serial No. 409,201

Claims priority, application Germany February 12, 1953

5 Claims. (Cl. 74—388)

My invention relates to a reversible torque amplifier of the frictional type in which the amplified torque is imparted to a power take-off shaft by means of friction bands acting upon a drum under control by a lever coacting with a control shaft, and will be described hereinafter with reference to the drawings in which:

Fig. 2 is a sectional view in an axial plane of a torque amplifier embodying an example of the invention; and Fig. 3 is a partly sectional view of the same amplifier, the section being in the radial plane denoted by III—III in Fig. 2.

Figure 1:
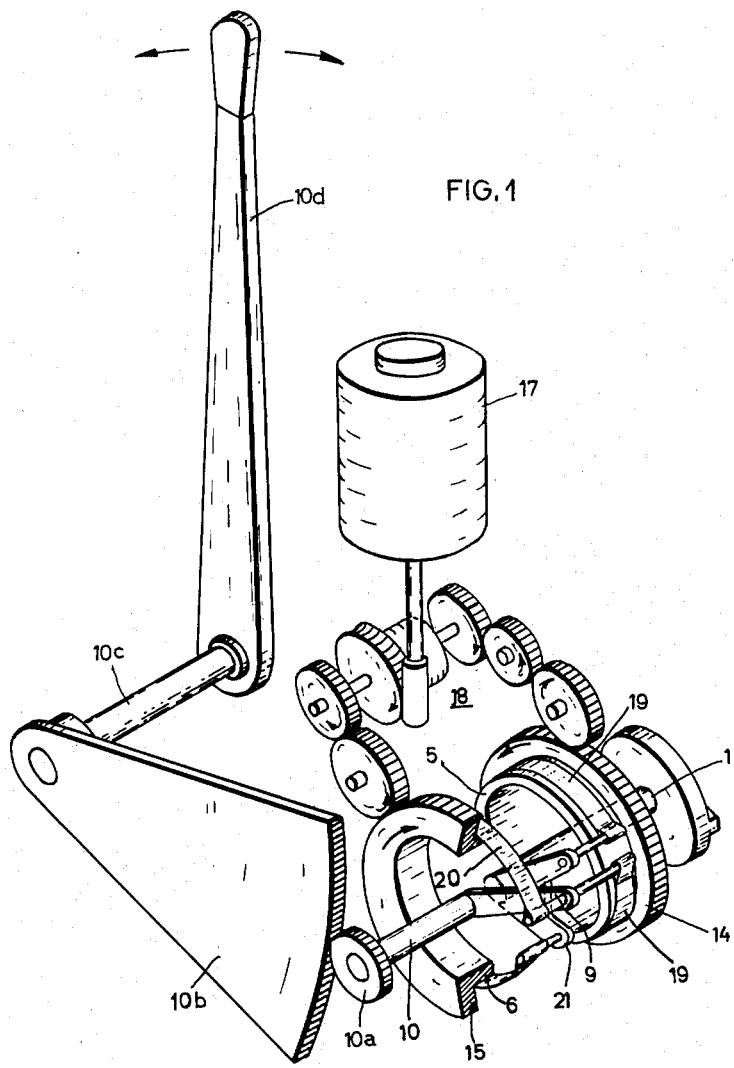
Fig. 1 is a schematical and perspective illustration of a frictional torque amplifier and serves to explain the principle of operation of the type of amplifier improved by the present invention.

The torque amplifier according to Fig. 1 has a take-off shaft 1 which is to revolve in one or the other direction in dependence upon the revolving direction of a control shaft 10. The torque to be applied to the control shaft 10 is supposed to be considerably smaller than the output torque available from take-off shaft 1 for the operation of a machine or apparatus to be positionally controlled, for instance, the drive control switch of an electric streetcar, trolley-bus or other electrically driven conveyance.

For transmitting such an amplified torque, two friction drums 5 and 6 are provided, each being rigidly joined with a coaxial spur gear 14 and 15. When in operation, the two spur gears revolve in mutually opposed directions, being driven from a motor 17 through gear transmissions 18. Two friction bands 19 and 20 extend about the respective drums 14, 15 and are slidably engageable therewith. One end of each friction band is secured to an arm 9 rigidly mounted on the control shaft 10. The other end of each friction band is secured to a structure 21 firmly mounted on the take-off shaft 1. The points where the friction bands 19 and 20 are joined with the structure 21 are located at opposite sides respectively of the point where the bands are attached to the arm 9. When shaft 1 is in phase with the control shaft 10, the two friction bands 19 and 20 are so loose that the drums 5 and 6 can freely revolve. However, when the control shaft 10 is turned a slight angle to one or the other side, either band 19 or band 20 is tautened and enters into frictional engagement with the periphery of the corresponding friction drum 5 or 6. The drum then entrains the friction band and thus drives the structure 21 and hence the take-off shaft 1.

The control shaft 10 is shown to carry a pinion 10a in meshing enagegment with a spur gear segment 10b on a shaft 10c firmly joined with a control lever 10d. Displacement of the control lever 10d by the operator causes the control shaft 10 to revolve a corresponding amount in one or the other direction from the illustrated position; and the revolution of control shaft 10 is transmitted by the above-described frictional devices to the take-off shaft 1 with a considerable amplification of the torque under the effect of the power supply from motor 17.

In the known designs of torque amplifiers of this frictional type, one of the friction drums is journalled on the take-off shaft and the other on the control shaft, the relative movement between the two shafts being only slight. In such amplifiers, the occurrence of irregularities in the bearings of the friction drums on the shafts may result in appreciable disturbance of the amplifier operation. This is because even a slight clamping or sticking at the bearings of the drum running on the control shaft is transmitted to the take-off shaft. The entire counterforce needed to counteract this effect must be applied to the control shaft or control lever.

It is an object of my invention to eliminate such deficiencies and to provide a frictional torque amplifier in which any trouble, apt to interfere with the proper torque amplification due to bearing defects or similarly effective disturbances, is transmitted to the controlling member or manual in the inverse transmission ratio of the torque amplifier thus being greatly minimized or virtually obviated as regards its detrimental effect upon the effort required for operating the control member.

To this end, and in accordance with a feature of my invention, the friction drums of a reversible torque converter acting upon a power take-off shaft by means of friction bands under control by a reversible control shaft, are both journalled upon respective bearings that are both firmly joined with the take-off shaft.

The above-mentioned and other objects and features of the invention will be apparent from the following description of the embodiment illustrated in Figs. 2 and 3.

According to Figs. 2 and 3, the take-off shaft 1 is rigidly connected with a flange member 2. A tubular shaft or sleeve 3 is coaxially aligned with shaft 1 and has a flange portion 4 located adjacent to the flange member 2 but axially spaced therefrom. Flange member 2 and flange portion 4 are rigidly connected with each other by screws 4a so that the sleeve 3 forms a part or extension of the take-off shaft 1.

The friction drums 5 and 6 run on respective pairs of ball bearings 7 and 8. The ball bearings 7 for drum 5 have their inner race members mounted on the take-off shaft 1, while the ball bearings for drum 6 are seated upon the extension sleeve 3.

The control shaft 10 is journalled in the sleeve 3 and freely revolvable relative thereto. An arm 9 is rigidly mounted on the control shaft 10 and located in the space between the flange member 2 and the flange portion 4. Arm 9 carries a counterpoise 9a at one side and a fastening bolt 9b at the opposite side. The friction bands 19 and 20 have one end 19a or 20a secured to the bolt 9b. From bolt 9b, the two friction bands extend in mutually opposed directions about the respective drums 19 and 20 to a bolt, such as the one shown at 16a in Fig. 3, which is rigidly secured to an annular part 16 firmly joined with the flange member 2. The annular part 16 therefore forms a rigid component of the output shaft assembly and performs the function of the part denoted by 21 in Fig. 1. Part 16 has a marginal gap traversed by the fastening bolt 9b and just wide enough to permit movement of the lever 9 for tightening the friction bands in one or the other direction.

The two friction drums 5 and 6 are rigidly connected by screws 5a and 6a with respective coaxial spur gears 14 and 15 (see also Fig. 1). Inserted between drum 5 and gear 14 and fastened by the screws 5a is an annular sheet-metal structure 13 that forms part of a housing. A similar annular sheet metal member 12 is fastened between drum 6 and gear 15. The main portion of the housing consists of a cylindrical shell structure 11 that extends between the members 12 and 13 and is firmly secured to the ring member 16 by means of screws 11a. The housing shell 11 therefore is firmly joined with the take-off shaft 1 to revolve together therewith.

The torque amplifier according to Figs. 2 and 3 is otherwised designed in accordance with Fig. 1. That is, the power required for the torque amplification is supplied from a motor to the spur gears 14 and 15, revolving these gears in mutually opposed directions; and the control shaft 10 is actuated by a displaceable control member as exemplified by the parts 10a to 10d in Fig. 1.

In a device according to Figs. 2 and 3, the bearings of both friction drums are joined with the power take-off shaft of the amplifier. Hence any interfering forces or torques due to wear or sticking of the bearings are slight or negligible as far as the power output is concerned and are transmitted to the control shaft of the amplifier only to a greatly reduced degree, namely in inverse proportion to the amplifying factor of the device.

As a result, only slight efforts are sufficient to obviate any faulty operation of the amplifier that may be due to clamping or sticking of the bearings or similar disturbances. This is especially of advantage when the amplifier, as in the assembly of a controller for an electric propulsion drive, is manually controlled by an attendant. Any defective switching or controlling operation of the amplifier can readily be eliminated by the attendant.

While amplifiers according to the invention have been found especially useful in electric propulsion and hoist controls requiring particular attention to safety and reliability requirements, the invention is also applicable to many other purposes where a servo-motoric transmission and torque amplification is required.

It will be understood by those skilled in the art upon a study of this disclosure that the invention permits of various alterations and modifications especially as regards the particular design and arrangement of the individual amplifier components, without departing from the essential features of the invention and within the scope of the claims annexed hereto.

I claim:

1. A reversible torque amplifier of the frictional type, comprising a reversibly revolvable control shaft, a reversibly revolvable power take-off shaft, two opposingly driven friction drums revolvable relative to said two shafts, two friction bands each having one end joined with said take-off shaft and extending from said end around one of said respective drums in a direction opposed to the corresponding direction of the other band, said bands having their respective other ends joined with said control shaft for selectively tightening one of said bands against its drum depending upon the actuating direction of said control shaft, respective bearing means on which said two drums are revolvably seated, said bearing means of both said drums being firmly connected with said take-off shaft.

2. A reversible torque amplifier of the frictional type, comprising a take-off shaft, a sleeve member axially aligned and firmly joined with said take-off shaft to form an extension thereof, a reversibly revolvable control shaft axially aligned with said take-off shaft and revolvably journalled in said sleeve, two revolvable friction drums having respective drive gears to be driven in mutually opposed directions, one of said drums being revolvably mounted on said take-off shaft and said other drum being revolvably mounted on said sleeve, two friction bands each having one end joined with said take-off shaft and extending from said end around one of said respective drums in a direction opposed to the corresponding direction of the other band, said bands having their respective other ends joined with said control shaft for selectively tightening one of said bands against its drum depending upon the actuating direction of said control shaft.

3. A reversible torque amplifier of the frictional type, comprising a take-off shaft, a flange member firmly mounted on the end of said take-off shaft, a sleeve member axially aligned with said take-off shaft and having a flange portion adjacent to said flange member but axially spaced therefrom, means rigidly connecting said flange member and said flange portion with each other, a reversibly revolvable control shaft axially aligned with said take-off shaft and revolvably journalled in said sleeve, an arm firmly secured to said control shaft between said flange member and said flange portion, two opposingly driven friction drums journalled on said take-off shaft and on said sleeve respectively, two friction bands each having one end attached to said arm and the other end to said flange member and extending from said arm about one of said drums in a direction opposed to the corresponding direction of the other band so that said bands are selectively tightened against said drums depending upon the revolving direction of said control shaft.

4. A reversible torque amplifier according to claim 1, comprising a housing concentric to said two shafts and enclosing said drums and bands.

5. A reversible torque amplifier according to claim 3, comprising a cylindrical housing concentric to said two shafts and secured to said flange member to revolve together with said take-off shaft.

References Cited in the file of this patent

UNITED STATES PATENTS

| 2,341,989 | Horstmann | Feb. 15, 1944 |

FOREIGN PATENTS

| 255,640 | Italy | Oct. 29, 1927 |
| 377,938 | France | Sept. 19, 1907 |